(12) United States Patent
Chien et al.

(10) Patent No.: US 8,947,366 B2
(45) Date of Patent: Feb. 3, 2015

(54) CAPACITIVE TOUCH PANEL AND FABRICATING METHOD THEREOF

(75) Inventors: Yu-Feng Chien, Taipei County (TW); Tun-Chun Yang, Taipei (TW); Seok-Lyul Lee, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 1257 days.

(21) Appl. No.: 12/352,613

(22) Filed: Jan. 13, 2009

(65) Prior Publication Data

US 2009/0315859 A1 Dec. 24, 2009

(30) Foreign Application Priority Data

Jun. 23, 2008 (TW) ............................... 97123383 A
Dec. 5, 2008 (TW) ............................... 97147396 A

(51) Int. Cl.
*G06F 3/041* (2006.01)
*G06F 3/044* (2006.01)
(52) U.S. Cl.
CPC ..................................... *G06F 3/044* (2013.01)
USPC ...... 345/173; 345/174; 178/18.01; 178/18.06
(58) Field of Classification Search
CPC ............... G06F 2203/4111; G06F 2203/4112; G06F 3/044; G06F 2203/04111; G06F 2203/04112; G06F 3/047; G06F 3/0202; H03K 2017/9602
USPC ...................... 345/173–178; 178/18.01, 18.06
See application file for complete search history.

(56) References Cited

U.S. PATENT DOCUMENTS

| 6,147,680 | A | 11/2000 | Tareev |
| 6,970,160 | B2 | 11/2005 | Mulligan et al. |
| 8,199,127 | B2 * | 6/2012 | Mamba et al. ................ 345/174 |
| 2004/0239650 | A1 * | 12/2004 | Mackey ........................ 345/174 |
| 2005/0030048 | A1 * | 2/2005 | Bolender et al. .............. 324/661 |
| 2005/0190161 | A1 * | 9/2005 | Hong et al. ................... 345/173 |

(Continued)

FOREIGN PATENT DOCUMENTS

| JP | 60-241122 | 11/1985 |
| TW | I271645 | 1/2007 |
| TW | I333218 | 11/2010 |

OTHER PUBLICATIONS

"Office Action of Taiwan Counterpart Application", issued on May 16, 2012, p. 1-p. 5.

*Primary Examiner* — Gregory J Tryder
(74) *Attorney, Agent, or Firm* — Jianq Chyun IP Office

(57) ABSTRACT

A capacitive touch panel including a substrate, a plurality of first touch pads, a plurality of first dummy pads, an insulator layer, a plurality of second touch pads, and a plurality of second dummy pads is provided. The first touch pads arranged along a first direction are electrically connected. Each first touch pad has at least a first opening. The insulator layer covers the first touch pads and the first dummy pads insulated therefrom. The second touch pads arranged along a second direction are electrically connected and each second touch pad has at least a second opening. The size of the second opening is substantially larger than that of each first dummy pad. The second dummy pads insulated from the second touch pads are disposed on the insulator layer above the first opening, wherein the size of the first opening is substantially larger than that of each second dummy pad.

17 Claims, 10 Drawing Sheets

(56) References Cited

U.S. PATENT DOCUMENTS

| | | |
|---|---|---|
| 2006/0097991 A1 | 5/2006 | Hotelling et al. |
| 2006/0232559 A1 | 10/2006 | Chien et al. |
| 2007/0262962 A1* | 11/2007 | XiaoPing et al. ............. 345/173 |
| 2008/0211395 A1* | 9/2008 | Koshihara et al. ............ 313/504 |
| 2008/0309633 A1* | 12/2008 | Hotelling et al. ............. 345/173 |
| 2009/0002337 A1* | 1/2009 | Chang ........................... 345/174 |
| 2009/0096758 A1* | 4/2009 | Hotelling et al. ............. 345/173 |
| 2009/0159344 A1* | 6/2009 | Hotelling et al. .......... 178/18.06 |

* cited by examiner

CAPACITIVE TOUCH PANEL AND FABRICATING METHOD THEREOF

CROSS-REFERENCE TO RELATED APPLICATION

This application claims the priority benefits of Taiwan patent application serial no. 97123383, filed on Jun. 23, 2008, and application serial no. 97147396, filed on Dec. 5, 2008. The entirety of each of the above-mentioned patent applications is hereby incorporated by reference herein and made a part of specification.

BACKGROUND OF THE INVENTION

1. Field of the Invention

The present invention relates to a capacitive touch panel and a fabricating method thereof, and particularly relates to a capacitive touch panel and a fabricating method thereof for improving visual effects.

2. Description of Related Art

As technology advances, digital appliances, such as mobile phones, personal digital assistants, notebooks, and plane computers, are developed to be more convenient, multi-function, and exquisite. Screens are indispensable interface between users and these mobile phones, personal digital assistants, notebooks, and plane computers. Through screens, users may operate these products more conveniently. At present, liquid crystal display devices are utilized as screens in most products.

As information technology, wireless mobile communication, and information electric appliances rapidly develop in recent years, input devices for a great many information electronic products have been changed from conventional keyboards and mice to touch panels for the purposes of convenience, miniaturization, and being user-friendly. Especially, a capacitive touch liquid crystal display device has become the most popular product among all.

FIGS. 1A and 1B respectively illustrate a top view and a cross-sectional view of a conventional capacitive touch panel. As shown in FIGS. 1A and 1B, a conventional capacitive touch panel 100 comprises a substrate 110, a plurality of first touch pads 120, an insulator layer 130, and a plurality of second touch pads 140. To be more specific, the first touch pads 120 are disposed on the substrate 110 and electrically connected with one another by first connection lines 128, and the first touch pads 120 are arranged along a first direction D1. The insulator layer 130 is disposed on the substrate 110 to cover the first touch pads 120. The second touch pads 140 are disposed on the insulator layer 130 and electrically connected with one another by second connection lines 148, and the second touch pads 140 are arranged along a second direction D2, wherein the first touch pads 120 and the second touch pads 140 do not exist any opening and a region between each first touch pad 120 and each second touch pad 140 does not exist any pattern. The first touch pads 120 and the second touch pads 140 constitute a sensing array on the substrate 110 to achieve the purpose of plane sensing.

Based on the above, when the user touches the capacitive touch panel 100 by finger and the position where the first touch pads 120 and the second touch pads 140 are disposed contacted by the finger causes a capacitance change due to the equivalent series connection between the finger and the parasitic capacitance of the original touch pads. The change of capacitance is converted into a current signal which is transmitted to a control circuit board. After a central processing unit processes the data and calculates to obtain a result, the control circuit board thereby outputs a display signal to the display panel, and the display panel displays images to the user.

However, the touch pads in this type of capacitive touch panel are fabricated in different layers, which easily causes the discrepancy of transmittance between different layers, as Light T1 and Light T3 in FIG. 1B. Further, because the touch pads are disposed in different layers, the transmittance uniformity of the whole capacitive touch panel is also influenced by the positions of the touch pads. For instance, referring to FIG. 1B, the transmittance obtained when Light T2 passes through the capacitive touch panel is different from that obtained when Light T1 and T3 pass through the capacitive touch panel. The above factors all cause the problem of color aberration when the user watches the capacitive touch panel.

Additionally, when the capacitive touch panel is applied into a display panel or an opto-electronic device, the user may notice the touch pads of the capacitive touch panel. The discrepancy of display quality becomes even more obvious between the areas with and without the touch pads. Hence, how to improve the whole display uniformity and visual effects of the capacitive touch panel has become a challenge in the technology of fabricating capacitive touch panels.

SUMMARY OF THE INVENTION

The present invention relates to a capacitive touch panel which effectively reduces color aberration during a user's observation and provides better visual effects.

The present invention further relates to a display panel, which comprises the aforesaid capacitive touch panel for improving display quality.

The present invention further relates to an electro-optical apparatus, which comprises the aforesaid display panel for improving display quality.

The present invention further relates to a method for fabricating a capacitive touch panel, which is adapted for fabricating the aforesaid capacitive touch panel.

The present invention further relates to a method for fabricating a display panel, which comprises the aforesaid method for fabricating a capacitive touch panel.

The present invention further relates to a method of fabricating an electro-optical apparatus, which comprises the aforesaid method for fabricating a display panel.

The present invention provides a capacitive touch panel, comprising a substrate, a plurality of first touch pads, a plurality of first dummy pads, an insulator layer, a plurality of second touch pads, and a plurality of second dummy pads. The first touch pads are disposed on the substrate. The first touch pads are arranged along a first direction and electrically connected with one another. Each first touch pad comprises at least a first opening. The first dummy pads are disposed on the substrate and insulated from the first touch pads. The insulator layer is disposed on the substrate to cover the first touch pads and the first dummy pads. The second touch pads are disposed on the insulator layer. The second touch pads are arranged along a second direction and electrically connected with one another. Each second touch pad comprises at least a second opening disposed above the first dummy pads, and the size of the second opening is substantially larger than that of each first dummy pad. The second dummy pads are disposed on the insulator layer and insulated from the second touch pads, wherein the second dummy pads are arranged above the first opening. The size of the first opening is substantially larger than that of each second dummy pad.

The present invention provides a display panel, which comprises the aforesaid capacitive touch panel.

The present invention provides an electro-optical apparatus, which comprises the aforesaid display panel.

The present invention further provides a method for fabricating a capacitive touch panel, which comprises the following processes. First, a plurality of first touch pads and a plurality of first dummy pads are formed on a substrate. The first touch pads are arranged along a first direction and electrically connected with one another, and each first touch pad has at least a first opening. The first dummy pads are insulated from the first touch pads. Next, an insulator layer is formed on the substrate to cover the first touch pads and the first dummy pads. Thereafter, a plurality of second touch pads and a plurality of second dummy pads are formed on the insulator layer. The second touch pads are arranged along a second direction and electrically connected with one another. Each second touch pad has at least a second opening arranged above the first dummy pads. The second dummy pads are insulated from the second touch pads, and the second dummy pads are above the first opening, wherein the size of the second opening is substantially larger than that of each first dummy pad, and the size of the first opening is substantially larger than that of each second dummy pad.

The present invention provides a method for fabricating a display panel, which comprises the aforesaid method for fabricating a capacitive touch panel.

The present invention provides a fabricating method of an electro-optical apparatus, which comprises the aforesaid method for fabricating a display panel.

To conclude, in the present invention at least one opening is disposed in each layer where touch pads are formed, and dummy pads are disposed on the other layer to correspond to the positions of the openings of the touch pads, so as to reduce color aberration which occurs when light passes through the touch pads of different layers. In addition, partial openwork regions are arranged between the touch pads and the corresponding dummy pads to further improve the light transmittance of the whole capacitive touch panel. Moreover, in another embodiment of the present invention, dummy pads may be selectively disposed in a proper position in a capacitive touch panel, so as to further enhance visual effects.

To make the above and other objectives, features, and advantages of the present invention more comprehensible, preferable embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
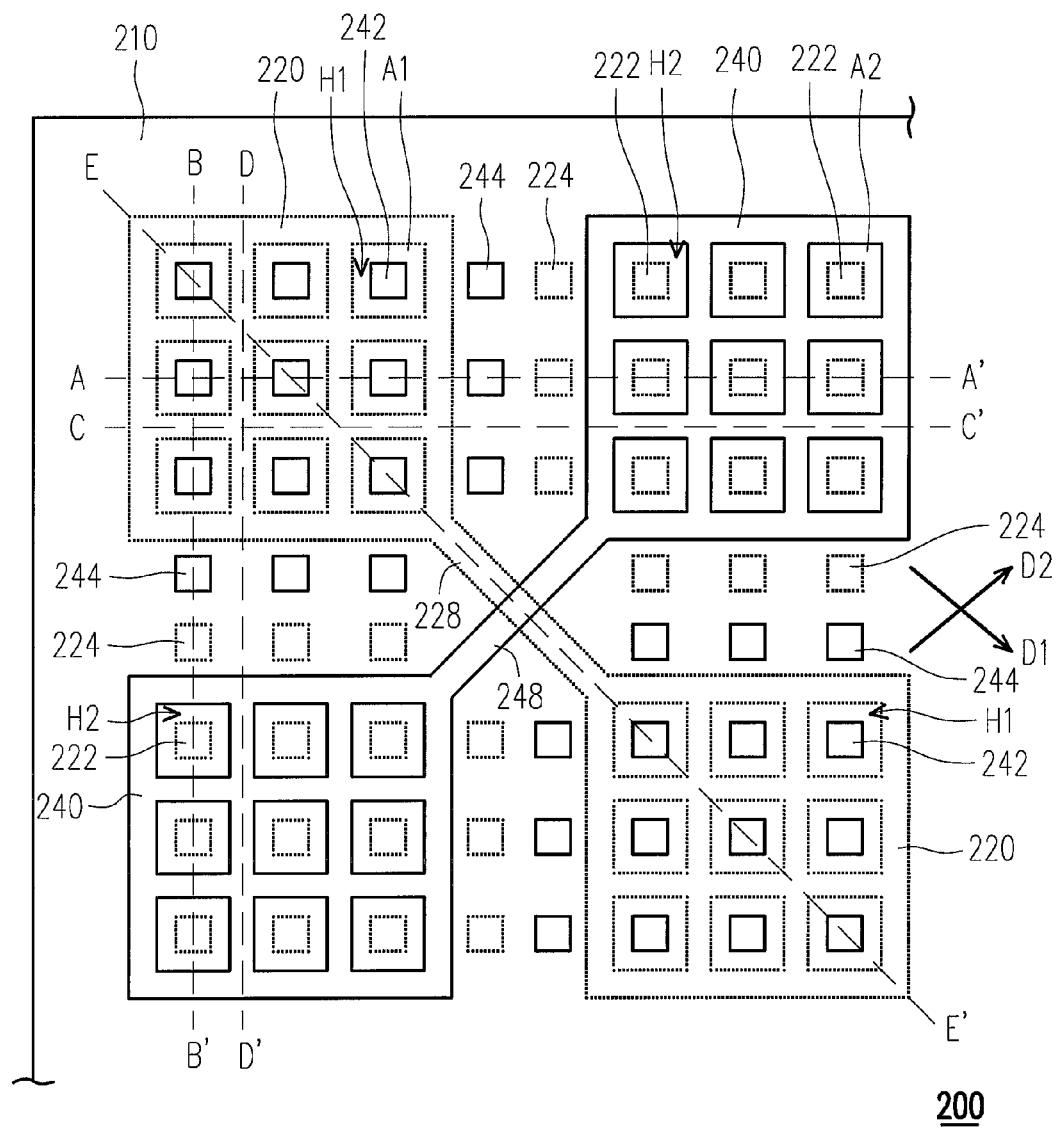
FIGS. 2A through 2D illustrate a capacitive touch panel according to an embodiment of the present invention.
Figure 2B:
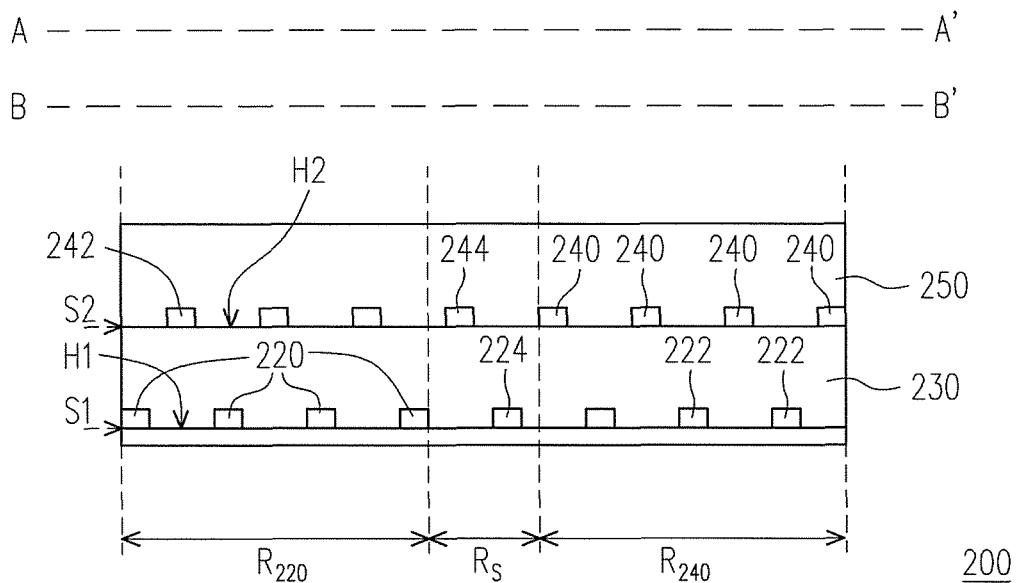
Figure 2C:
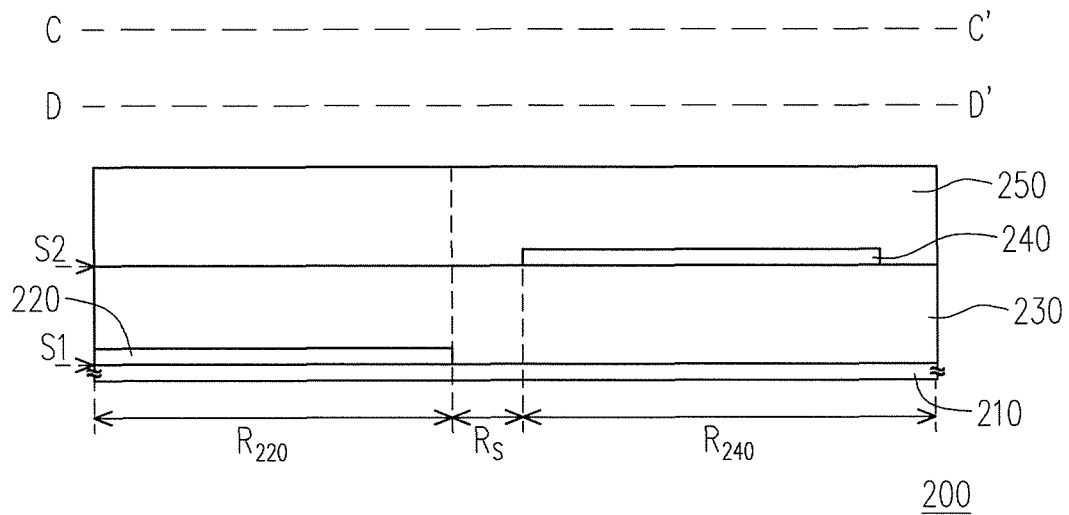
Figure 2D:
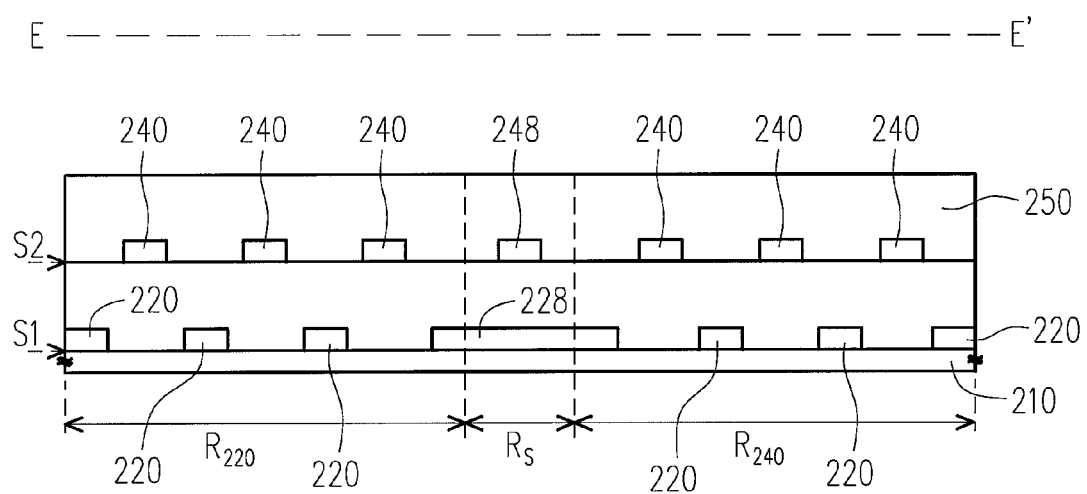

FIGS. 2A through 2D illustrate a capacitive touch panel according to an embodiment of the present invention, wherein FIG. 2A is a top view of a capacitive touch panel 200, FIG. 2B illustrates a cross-sectional view of the capacitive touch panel along Line AA' or Line BB', FIG. 2C illustrates a cross-sectional view of the capacitive touch panel along Line CC' or Line DD', and FIG. 2D illustrates a cross-sectional view of the capacitive touch panel along Line EE'. For clarity, FIGS. 2B through 2D respectively illustrate the touch pads and dummy pads of the capacitive touch panel and relative positions thereof. Other layers may be omitted for simplicity.

As shown in FIGS. 2A through 2D, the capacitive touch panel 200 of this embodiment comprises a substrate 210, a plurality of first touch pads 220, a plurality of first dummy pads 222, an insulator layer 230, a plurality of second touch pads 240, and a plurality of second dummy pads 242, wherein a material of the substrate 210 is, for example, an inorganic transparent material (e.g. glass, quartz, other suitable materials, or a combination of the above), an organic transparent material (e.g. polyolefne, polythiourea, polyalcohols, polyester, rubber, a thermoplastic polymer, a thermosetting polymer, polyarylene, polymethylmethacrylate, plastic, polycarbonate, other suitable materials, derivatives of the above, or a combination of the above), or a combination of the above. Referring to FIG. 2A, for clarity, the second touch pads 240 and the second dummy pads 242 on top are illustrated by solid lines, and the first touch pads 220 and the first dummy pads 222 underneath are illustrated by dotted lines. Moreover, in FIGS. 2A through 2D, a region of the first touch pads 220 is indicated as $R_{220}$, a region of the second touch pads 240 is indicated as $R_{240}$, and a region between the first touch pads 220 and the second touch pads 240 is indicated as $R_S$, for providing a clear explanation.

Referring to FIGS. 2A through 2D, the first touch pads 220 and the first dummy pads 222 are disposed on the substrate 210. The first touch pads 220 are arranged along a first direction D1 and electrically connected with one another. Each first touch pad 220 has at least a first opening H1. Nine first openings H1 are illustrated in FIG. 2A, but the present invention is not limited thereto. The first dummy pads 222 are insulated from each first touch pad 220. The insulator layer 230 is disposed on the substrate 210 to cover the first touch pads 220 and the first dummy pads 222. The second touch pads 240 and the second dummy pads 242 are disposed on the insulator layer 230. The second touch pads 240 are arranged along a second direction D2 and electrically connected with one another. Each second touch pad 240 has at least a second opening H2 arranged above the first dummy pads 222. Nine second openings H2 are illustrated in FIG. 2A, but the present invention is not limited thereto. The second dummy pads 242 are insulated from each second touch pad 240, and the second dummy pads 242 are arranged above the first openings H1.

As shown in FIG. 2A, in this embodiment, the first openings H1 and the second openings H2 are, for example, respectively arranged as arrays in the first touch pads 220 and the second touch pads 240, but the present invention is not limited thereto. The first openings H1 and the second openings H2 may also be arranged in an irregular way. In addition, a shape of the aforesaid first touch pads 220, the second touch pads 240, the first openings H1, the second openings H2, the first dummy pads 222, or the second dummy pads 242 is substantially square, for example. Certainly, a shape of at least one of the first touch pads 220, the second touch pads 240, the first openings H1, the second openings H2, the first dummy pads 222, and the second dummy pads 242 may also be substantially circular, elliptic, triangle, rhombic, trapezoid, quadrilateral, pentagonal, hexagonal, star, waterdrop-shaped, or polygonal, but the present invention is not limited thereto.

Specifically, as shown in FIGS. 2A and 2B, the second dummy pads 242 are arranged above the first openings H1. In this embodiment, preferably a center of the first opening H1 is respectively substantial aligned with a center of one of the second dummy pads 242, but the present invention is not limited thereto. In other embodiments, the center of one of the second dummy pads 242 may be shifted from the center of the first opening H1. Preferably, the size of the first opening H1 is substantially larger than that of each second dummy pad 242. In other words, a partial openwork area (or namely opening of the meshed, opening of the reticular) exists between the second dummy pads 242 and the first touch pads 220 in a projection of the substrate 210, as a region A1 shown in FIG. 2A, so that light may pass through the openwork area A1. Additionally, the second opening H2 is arranged above the first dummy pads 222. In this embodiment, preferably a center of the second opening H2 is, for example, respectively substantial aligned with a center of one of the first dummy pads 222, but the present invention is not limited thereto. In other embodiments, the center of one of the first dummy pads 222 may be shifted from the center of the second opening H2. Preferably, the size of the second opening H2 is substantially larger than that of each first dummy pad 222. In other words, a partial openwork area (or namely opening of the meshed, opening of the reticular) exists between the first dummy pads 222 and the second touch pads 240 in a projection of the substrate 210, as a region A2 shown in FIG. 2A, so that light may pass through the openwork area A2.

It is noted that, different from the conventional technology, the present invention respectively disposes the first opening H1 and the second opening H2 in the first touch pads 220 and the second touch pads 240, and respectively disposes the second dummy pads 242 and the first dummy pads 222 in regions corresponding to the first opening H1 and the second opening H2. It is to say that, in the present invention, dummy pads are disposed in each layer to correspond to the openings in the touch pads of other layers. As a consequence, the problem of color aberration which occurs when light passes through the first touch pads 220 and the second touch pads 240 in different layers can be solved, and the visual effects of the capacitive touch panel 200 can be enhanced. Moreover, in the projection of the substrate 210, the partial openwork area A1 exists between the second dummy pads 242 and the first touch pads 220, and the partial openwork area A2 exists between the first dummy pads 222 and the second touch pads 240. Consequently, the light transmittance of the whole capacitive touch panel 200 is further improved.

In addition, as shown in FIG. 2A, two neighboring first touch pads 220 are, for example, serially connected by a plurality of first connection lines 228 disposed on the substrate 210, so as to electrically connect the first touch pads 220 with one another. Two neighboring second touch pads 240 are, for example, serially connected by a plurality of second connection lines 248 disposed on the insulator layer 230, so as to electrically connect the second touch pads 240 with one another. As shown in FIGS. 2A and 2D, each first connection line 228 respectively interlaces one of the second connection lines 248, and each first connection line 228 is insulated from each second connection line 248. Further, in this embodiment, preferably each first dummy pad 222 and each second dummy pad 242 are electrically floating, but the present invention is not limited thereto. It needs to be mentioned that the numbers of the first touch pads 220 and the second touch pads 240, and the numbers of the first dummy pads 222 or the second touch pads 240 may be determined according to actual requirements (for example, the size of the capacitive touch panel 200).

Referring to the cross-sectional views in FIGS. 2B to 2D, specifically the first touch pads 220 and the first dummy pads 222 are, for example, disposed on a first plane surface S1 above the substrate 210. The second touch pads 240 and the second dummy pads 242 are disposed on a second plane surface S2 above the substrate 210. The first touch pads 220 and the second touch pads 240 are respectively arranged along the first direction D1 and the second direction D2, and preferably these directions substantially interlace each other. In this embodiment, preferably the first direction D1 and the second direction D2 are, for example, perpendicular to each other, but the present invention is not limited thereto. It is to say that, an included angle between the first direction D1 and the second direction D2 may be any angle. A portion of the first direction D1 and a portion of the second direction D2 may also be parallel to each other.

In practice, the capacitive touch panel 200 of the present invention may further comprise a plurality of third dummy pads 224 and a plurality of fourth dummy pads 244 according to the layout space of the touch pads and dummy pads or other requirements, so as to have more uniform light transmittance and blur the edges of the first touch pads and the second touch pads. As shown in FIGS. 2A and 2B, the third dummy pads 224 are disposed on the substrate 210 and distributed between the first touch pads 220 and the first dummy pads 222. Each third dummy pad 224, the first touch pads 220, and each first dummy pad 222 are insulated from one another. The fourth dummy pads 244 are disposed on the insulator layer 230 and distributed between the second touch pads 240 and the second dummy pads 242. Each fourth dummy pad 244, the second touch pads 240, and each second dummy pad 242 are insulated from one another. In this embodiment, the third dummy pads 224 and the fourth dummy pads 244 are substantially arranged in parallel, but the present invention is not limited thereto. The third dummy pads 224 and the fourth dummy pads 244 may also be arranged to interlace one another or arranged in other suitable ways. Additionally, a shape of the third dummy pads 224 and the fourth dummy pads 244 is substantially rectangular, for example. Certainly, the shape thereof may also be substantially circular, elliptic, triangle, rhombic, trapezoid, quadrilateral, pentagonal, hexagonal, star, waterdrop-shaped, or polygonal, but the present invention is not limited thereto.

Based on the above, the brightness uniformity and touch pad resolution of the capacitive touch panel 200 in this embodiment can be more flexibly adjusted through disposing the third dummy pads 224 and the fourth dummy pads 244. It is noted that, in addition to the third dummy pads 224 and the fourth dummy pads 244, the size and shape of the first opening H1 and the second opening H2 or the size and shape of the corresponding first dummy pads 222 and second dummy pads 242 may be slightly varied to fine tune the light transmittance uniformity of the capacitive touch panel 200 when light passes through, so as to achieve best visual effects.

As shown in FIGS. 2B to 2D, the capacitive touch panel 200 in this embodiment may further comprise a passivation layer 250 disposed on the insulator layer 230 to cover the second touch pads 240 and the second dummy pads 242, but the present invention is not limited thereto. The passivation layer 250 may be not disposed according to the design requirement. A method for fabricating the capacitive touch panel 200 which comprises the passivation layer 250, the third dummy pads 224, and the fourth dummy pads 244, as shown in FIGS. 2A and 2B, is further provided. Referring to FIGS. 2A to 2D and FIGS. 3A to 3D, the method is described in detail as follows. FIGS. 3A to 3D illustrate a process flow for fabricating a capacitive touch panel according to the present invention, and FIGS. 3A to 3D respectively illustrate a top view and a cross-sectional view along Line AA' of the capacitive touch panel 200 during the fabrication thereof.

Figure 3A:
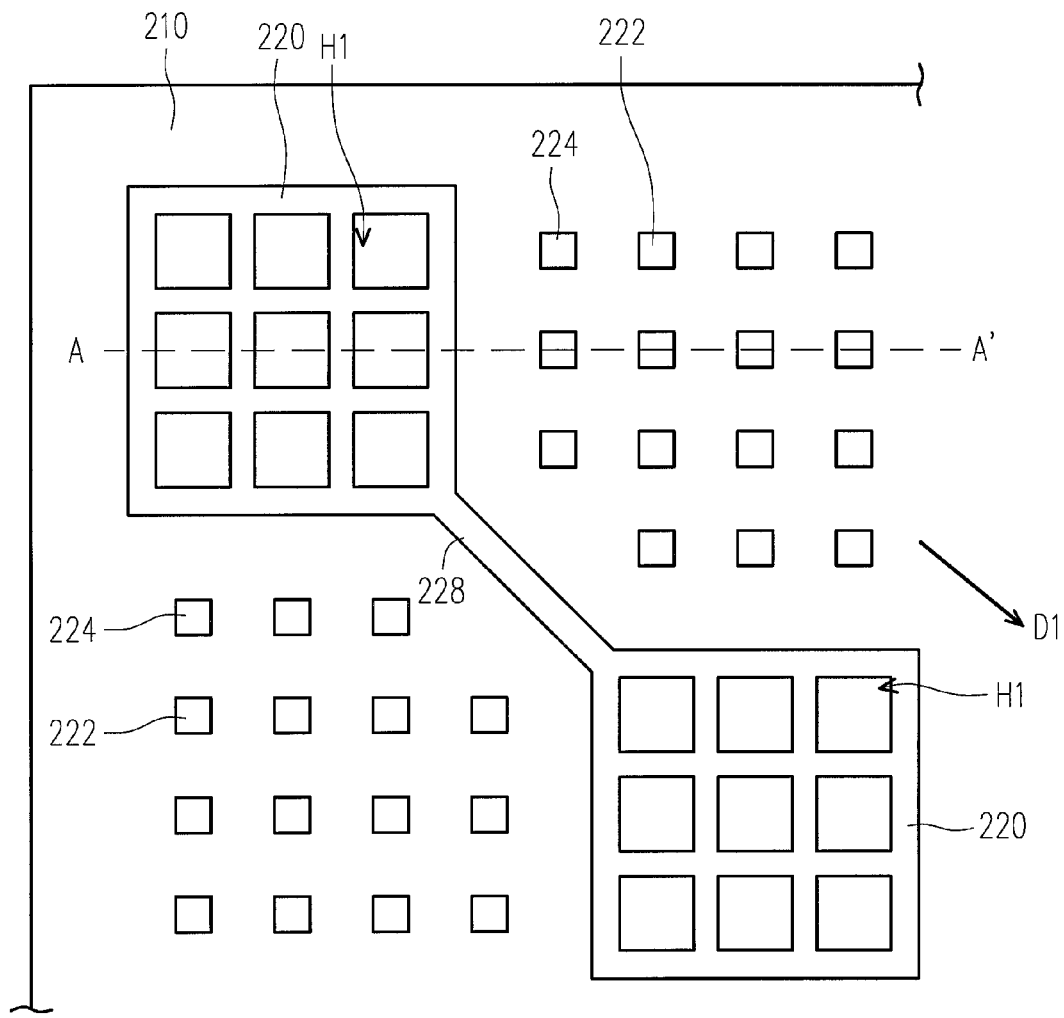
FIGS. 3A through 3D illustrate a process flow for fabricating a capacitive touch panel of the present invention.
Figure 3A:
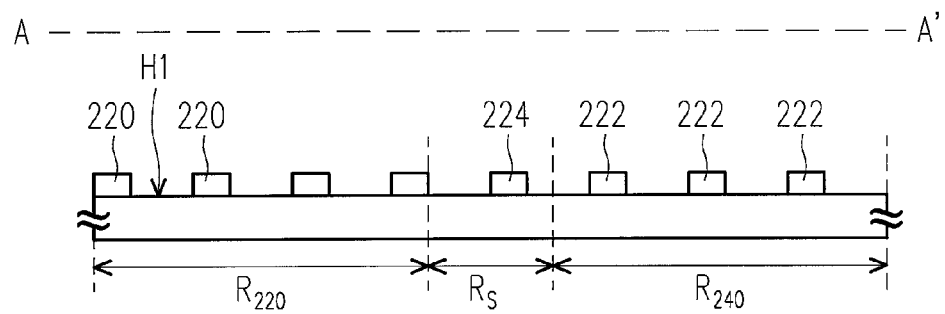

First, referring to FIG. 3A, a plurality of first touch pads 220 and a plurality of first dummy pads 222 are formed on a substrate 210. Herein, the first touch pads 220 are arranged along the first direction D1 and electrically connected with one another. Each first touch pad 220 has at least one first opening H1, and the first dummy pads 222 are insulated from each first touch pad 220, wherein two neighboring first touch pads 220 are, for example, electrically connected with each other by the first connection line 228. In this embodiment, the third dummy pads 224 may be selectively formed between the first touch pads 220 and the first dummy pads 222, so as to distribute the third dummy pads 224 on the substrate 210 between the first touch pads 220 and the first dummy pads 222. Specifically, a transparent conductive material layer (not shown), which is formed of indium tin oxide (ITO), indium zinc oxide (IZO), indium tin zinc oxide (ITZO), hafnium oxide, zinc oxide, aluminum oxide, aluminum tin oxide (ATO), aluminum zinc oxide (AZO), cadmium tin oxide (CTO), cadmium zinc oxide (CZO), other suitable materials, or a combination of the above, is formed on the substrate 210 first, for example. Then, a proper fabricating process is performed to pattern the transparent conductive material layer, so as to form the first touch pads 220, the first dummy pads 222, and the third dummy pads 224. In other embodiments, the first touch pads 220, the first dummy pads 222, and the third dummy pads 224 may be formed by an inkjet process, a screen printing process, a photolithography process, a photolithography and etching process, other suitable processes, or a combination of the above.

Figure 3B:
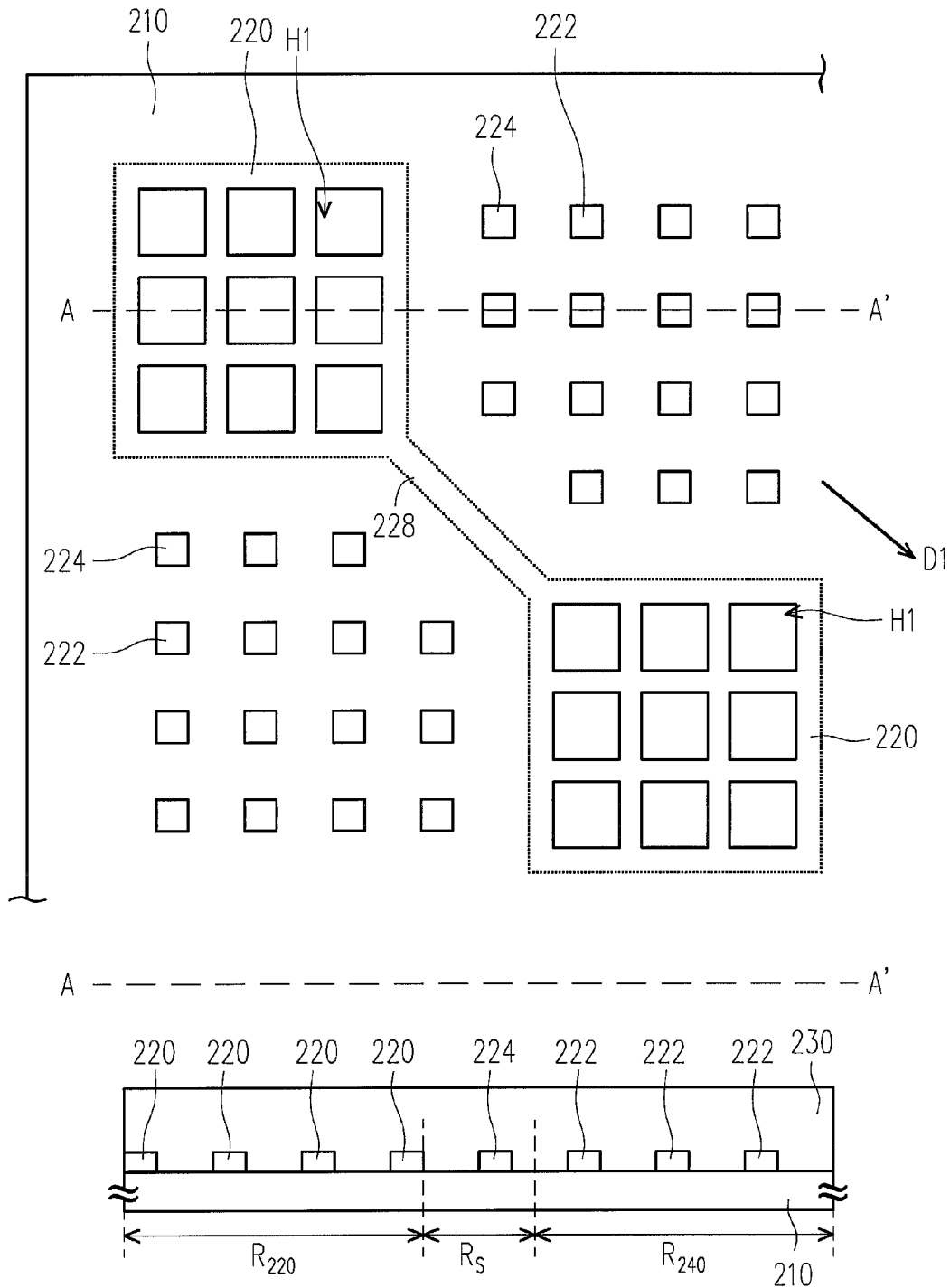

Next, as shown in FIG. 3B, the insulator layer 230 is formed on the substrate 210 to cover the first touch pads 220, the first dummy pads 222, and the third dummy pads 224. A material of the insulator layer 230 is, for example, an inorganic material (e.g. silicon oxide, silicon nitride, silicon oxynitride, silicon carbide, hafnium oxide, aluminum oxide, other materials, or a combination of the above), an organic material (e.g. photoresist, BCB, cycloolefin, polyimide, polyamide, polyester, polyalcohols, polyethylene, polyphenylene, resin, polyether, polyketone, other materials, or a combination of the above), or a combination of the above. To be more specific, one of the advantages of the present invention lies in that the insulator layer can be formed by using screen printing, offset printing, or other simpler fabricating processes without using a complicated fabricating process requiring photo mask exposure. However, the present invention is not limited thereto. In other embodiments, a photolithography and etching process may be performed to form patterns if required.

Figure 3C:
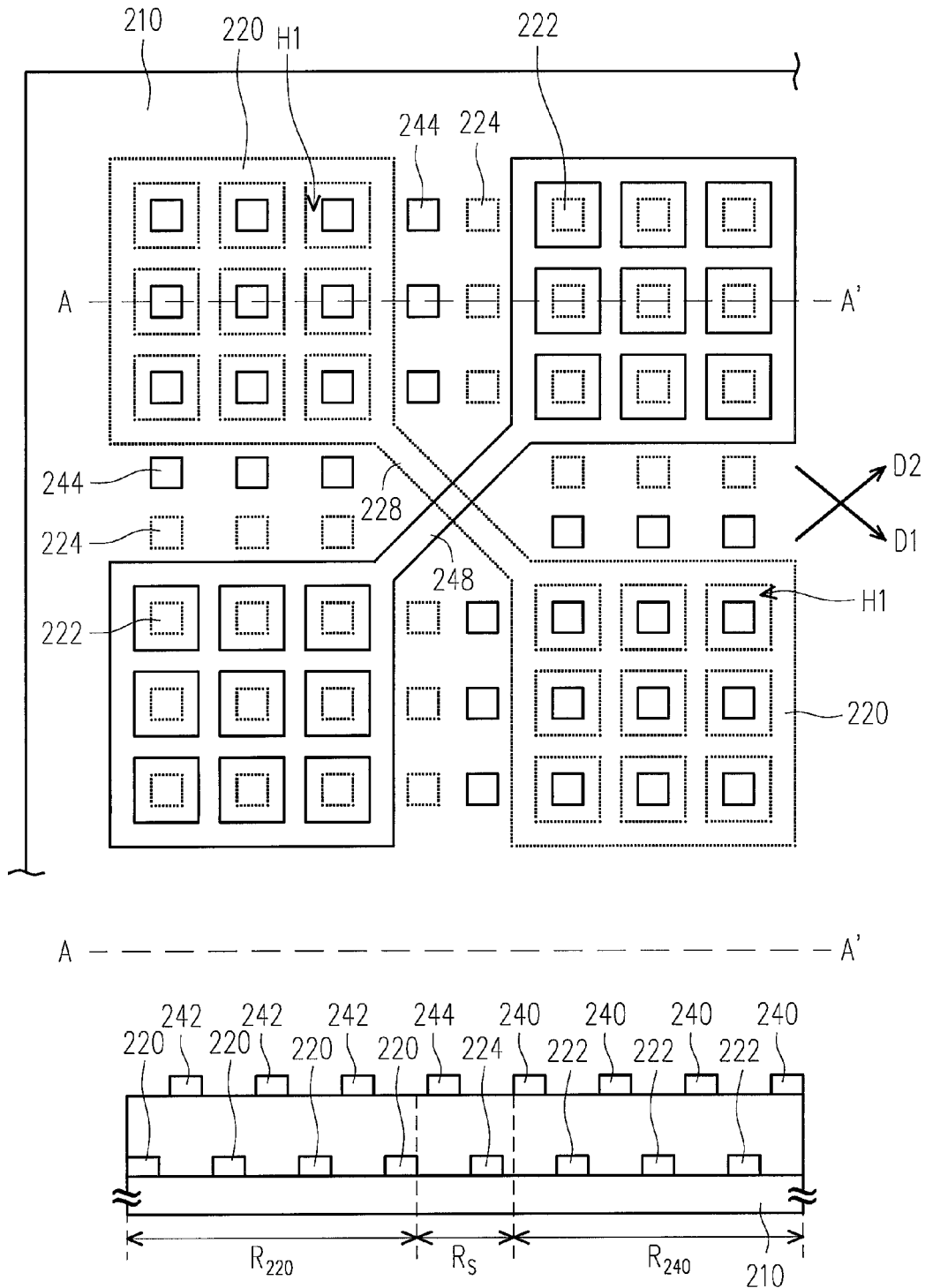

Thereafter, as shown in FIGS. 2D and 3C, a plurality of second touch pads 240 and a plurality of second dummy pads 242 are formed on the insulator layer 230. The second touch pads 240 are arranged along the second direction D2 and electrically connected with one another, wherein a method for electrically connecting the second touch pads 240 is, for example, to form the second connection line 248 between two neighboring second touch pads 240. As shown in the top view in FIG. 3C, the second connection line 248 interlaces the first connection line 228 underneath. As shown in FIG. 2D, each first connection line 228 and each second connection line 248 are insulated from each other. Moreover, as shown in FIG. 3C, each second touch pad 240 has at least one second opening H2 disposed above the first dummy pads 222, wherein preferably the size of the second opening H2 is substantially larger than the size of each first dummy pad 222. The second dummy pads 242 are insulated from each second touch pad 240, and the second dummy pads 242 are disposed above the first opening H1, wherein preferably the size of the first opening H1 is substantially larger than the size of each second dummy pad 242.

Referring to FIG. 3C, in practice, the capacitive touch panel 200 in this embodiment of the present invention may further comprise selectively forming the fourth dummy pads 244 between the second touch pads 240 and the second dummy pads 242 according to the layout space of the touch pads and dummy pads or other requirements, so as to distribute the fourth dummy pads 244 on the insulator layer 230 between the second touch pads 240 and the second dummy pads 242. Further, each fourth dummy pad 244, the second touch pads 240, and each second dummy pad 242 are insulated from one another. Similarly, a method for forming the second touch pads 240, the second dummy pads 242, the fourth dummy pads 244 is, for example, to form a transparent conductive material layer (not shown), which is formed of indium tin oxide (ITO), indium zinc oxide (IZO), indium tin zinc oxide (ITZO), hafnium oxide, zinc oxide, aluminum oxide, aluminum tin oxide (ATO), aluminum zinc oxide (AZO), cadmium tin oxide (CTO), cadmium zinc oxide (CZO), other suitable materials, or a combination of the above, on the substrate 210 first. Then, a proper fabricating process is performed to pattern the transparent conductive material layer, so as to form the second touch pads 240, the second dummy pads 242, and the fourth dummy pads 244. In other embodiments, the second touch pads 240, the second dummy pads 242, and the fourth dummy pads 244 may be formed by an inkjet process, a screen printing process, a photolithography process, a photolithography and etching process, other suitable processes, or a combination of the above. Herein, the position of the second dummy pads 242 corresponds to the first opening H1 underneath, and the position of the second opening H2 corresponds to the first dummy pads 222 underneath. It needs to be explained that, in this embodiment, preferably the center of each second dummy pad 242 is substantially aligned with the center of each first opening H1, and the center of each first dummy pad 222 is substantially aligned with the center of each second opening H2, but the present invention is not limited thereto. In other embodiments, the center of the second dummy pads 242 may be shifted from the center of the first opening H1 and/or the center of the first dummy pads 222 may be shifted from the center of the second opening H2.

Figure 3D:
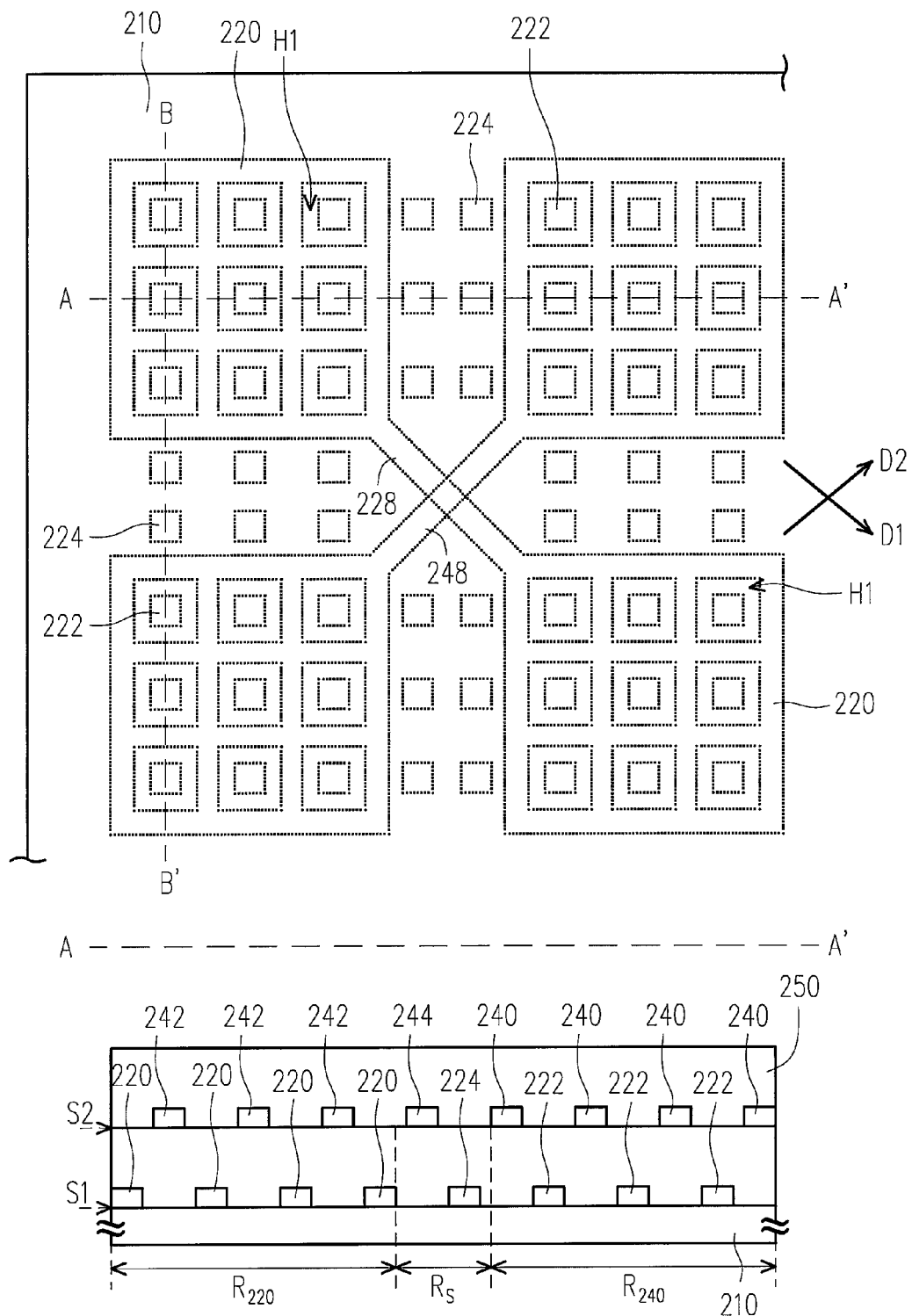

Then, referring to FIG. 3D, the passivation layer 250 is selectively formed on the insulator layer 230 to cover the second touch pads 240 and the second dummy pads 242, so as to form the capacitive touch panel 200 as shown in FIGS. 2A to 2D, wherein a material of the passivation layer 250 is, for example, an inorganic material (e.g. silicon oxide, silicon nitride, silicon oxynitride, silicon carbide, hafnium oxide, aluminum oxide, other materials, or a combination of the above), an organic material (e.g. photoresist, BCB, cycloolefin, polyimide, polyamide, polyester, polyalcohols, polyethylene, polyphenylene, resin, polyether, polyketone, other materials, or a combination of the above), or a combination of the above. To be more specific, one of the advantages of the present invention lies in that the passivation layer can be formed by using screen printing, offset printing, or other simpler fabricating processes without using a complicated fabricating process requiring photo mask exposure. However, the present invention is not limited thereto. In other embodiments, a photolithography and etching process may be performed to form patterns if required.

Based on the above embodiment, the first touch pads 220, the first dummy pads 222, and the third dummy pads 224 are preferably formed at the same time, for instance. It is to say that the first touch pads 220, the first dummy pads 222, and the third dummy pads 224 are formed on the same plane surface, as the first plane surface S1 in FIG. 3D, by patterning one transparent conductive material layer. However, the present invention is not limited thereto. In other embodiments, the first touch pads 220, the first dummy pads 222, and the third dummy pads 224 may be formed at different time by using different steps. For instance, the second touch pads 240, the second dummy pads 242, and the fourth dummy pads 244 are preferably formed at the same time. It is to say that the second touch pads 240, the second dummy pads 242, and the fourth dummy pads 244 are formed on another plane surface, such as the second plane surface S2 in FIG. 3D, by patterning one transparent conductive material layer. However, the present invention is not limited thereto. In other embodiments, the second touch pads 240, the second dummy pads 242, and the fourth dummy pads 244 may be formed at different time by using different steps. Hence, according to the present invention, the capacitive touch panel 200 having favorable light transmittance uniformity can be manufactured by using the original fabricating processes, so as to reduce color aberration without increasing the production costs thereof. Certainly, persons with ordinary skill in the field may refer to the above embodiments and vary the fabricating processes and arrangement of the elements without departing from the spirit of the present invention to meet their designs and actual requirements.

Additionally, in the above embodiment, the number of the openings H1 in the first touch pads 220 is the same as the number of the openings H2 in the second touch pads 240. However, the present invention is not limited thereto, and the numbers thereof may be different. Moreover, the first dummy pads 222, the second dummy pads 242, the third dummy pads 224, and the fourth dummy pads 244, as described in the above embodiment, all have the same shape, but the present invention is not limited thereto. These dummy pads may have different shapes. Furthermore, the first touch pads 220 and the second touch pads 240, as described in the above embodiment, all have the same shape, but the present invention is not limited thereto. These touch pads may have different shapes.

It is noted that, in the above embodiment of the present invention, the first touch pads 220 are disposed on the substrate 210 first, and then the second touch pads 240 are disposed. However, the present invention is not limited thereto. The sequence of disposing the first touch pads 220 and the second touch pads 240 may be changed.

Moreover, in the above embodiment of the present invention, preferably the first plane surface S1 and the second plane surface S2 are respectively a substantially plane surface on the substrate and a substantially plane surface on the insulator layer 230, but the present invention is not limited thereto. In other embodiments, at least one of the surfaces of the substrate, the insulator layer 230, and the passivation layer 250 may be uneven.

Figure 1A:
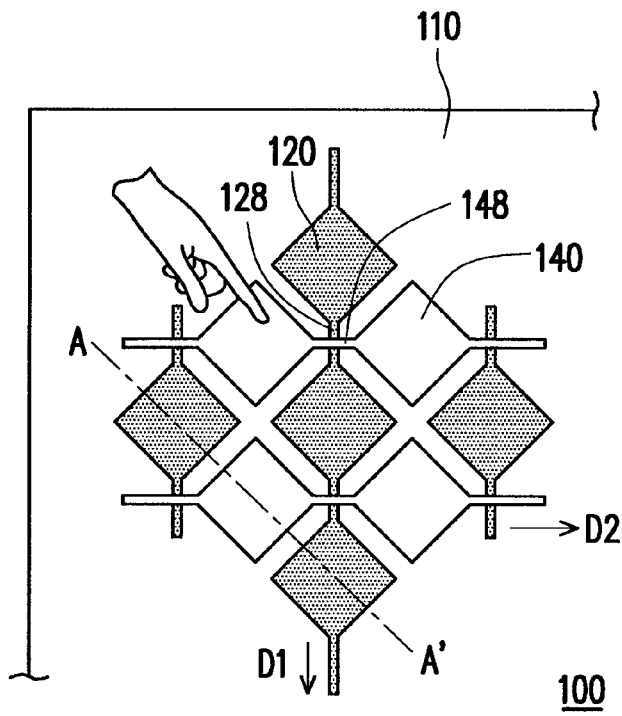
FIG. 1A and FIG. 1B respectively illustrate a top view and a cross-sectional view of a conventional capacitive touch panel.
Figure 1B:
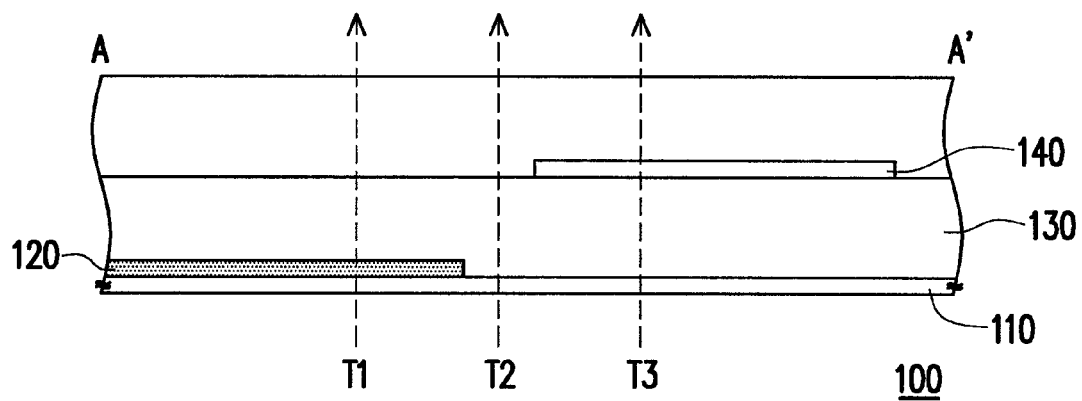
Figure 4:
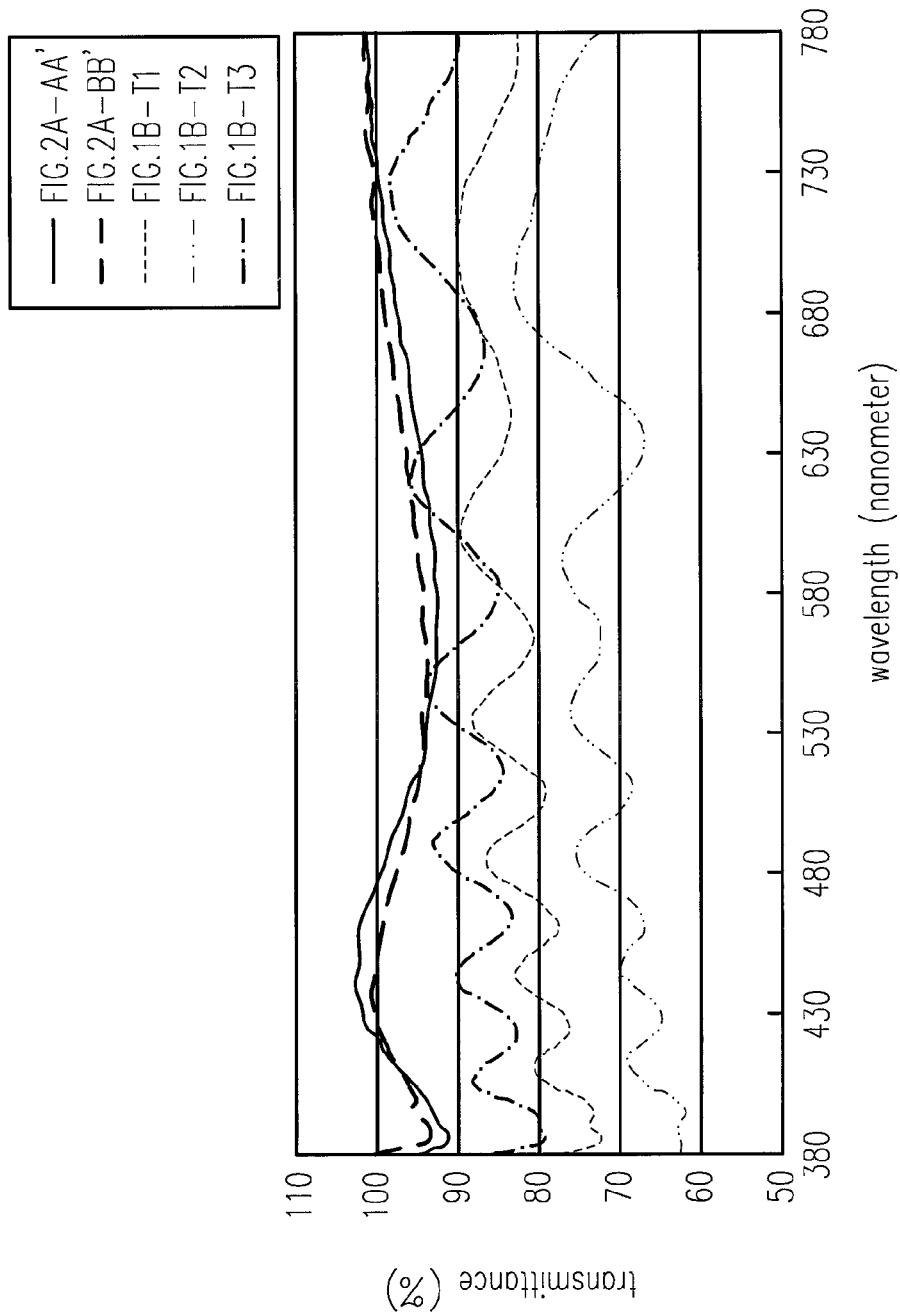
FIG. 4 illustrates the transmittances of a capacitive touch panel according to the present invention and the conventional capacitive touch panel under different wavelengths.

Take the capacitive touch panel 200 in FIG. 2 as an example, the comparison in transmittance between the capacitive touch panel 200 of the present invention and a conventional capacitive touch panel 100 in FIG. 1B is described as follows. FIG. 4 illustrates the transmittances of a capacitive touch panel according to the present invention and the conventional capacitive touch panel under different wavelengths. Referring to FIGS. 1B, 2A, 2B and 4, the transmittance of the capacitive touch panel 200 measured at $R_{220}$, such as the cross-section is along Line AA' and the transmittance is measured at $R_{240}$, such as the cross-section is along Line BB' are both better than the transmittance of the capacitive touch panel 100 at T1, T2, and T3, respectively. In other words, the capacitive touch panel 200 of the present invention has overall transmittance better than the conventional capacitive touch panel 100. Further, the capacitive touch panel 200 has less transmittance variation between different touch pads. Hence, in comparison with the conventional technology, the capacitive touch panel 200 of the present invention can improve the problem of color aberration when watched by a user, and greatly enhance the display quality of the display using the capacitive touch panel.

Figure 5:
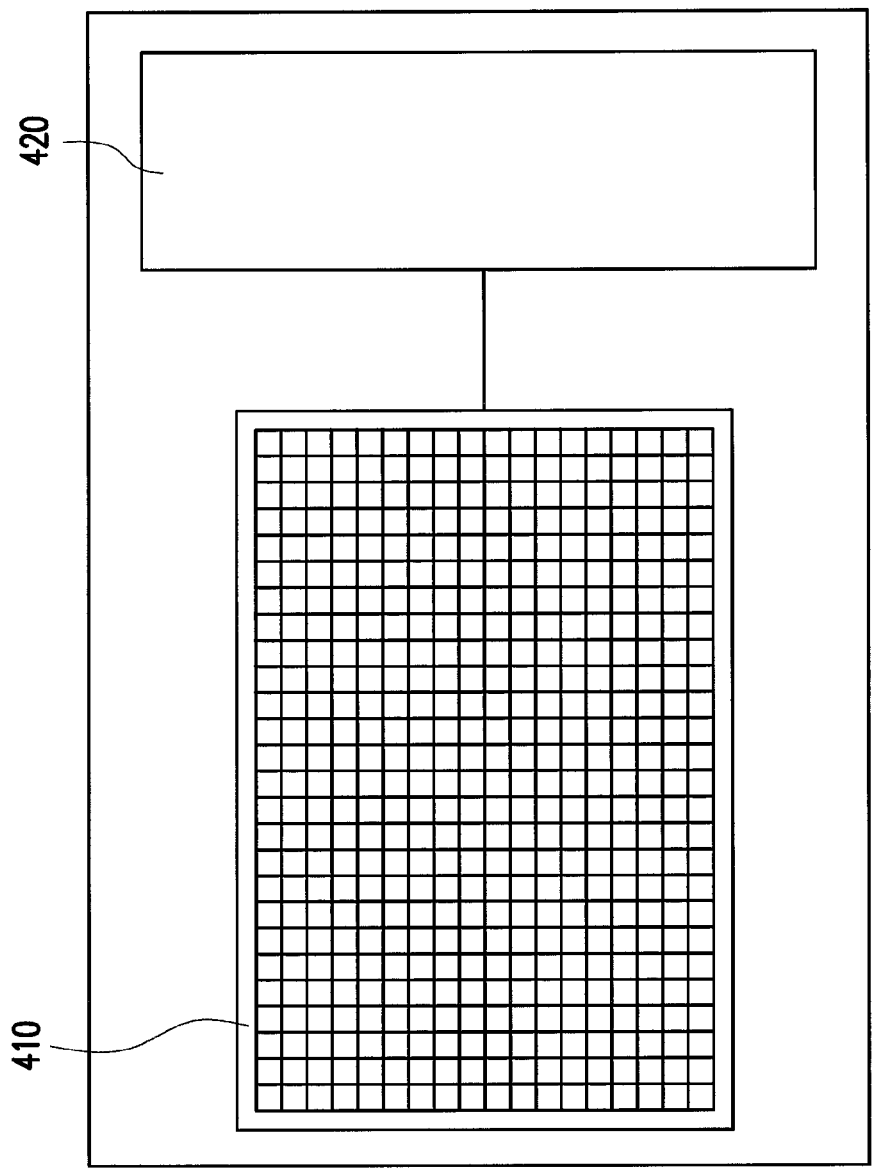
FIG. 5 illustrates an electro-optical apparatus of the present invention.

In practical application, the capacitive touch panel 200 of the present invention may be combined with common display devices, such as liquid crystal display panel, organic electroluminescent display panel, or conventional cold cathode ray tube screen, for the user to operate by directly touching the display frame. For instance, FIG. 5 illustrates an electro-optical apparatus according to the present invention. Referring to FIG. 5, a display panel 410 which has the capacitive touch panel described in the above embodiments may be electrically connected with an electronic element 420 to form an electro-optical apparatus 400. It needs to be explained that the electronic element 420 comprises a control element, an operating element, a processing element, an input element, a memory element, a driving element, a light emitting element, a protective element, a sensing element, a detecting element, elements having other functions, or a combination of the above. The types of the electro-optical apparatus 400 comprises portable products (e.g. a mobile phone, a camcorder, a camera, a laptop computer, a game player, a watch, a music player, an e-mail receiver and sender, a map navigator, a digital picture, or similar products), audio-video products (e.g. an audio-video player or similar products), screens, televisions, outdoor/indoor bulletins, panels in projectors, and so forth.

Additionally, a product of the display panel 410 at least comprises a pixel array substrate having the capacitive touch panel described in the above embodiments, another substrate, which has a transparent electrode, corresponding to the pixel array substrate, and display medium disposed between the pixel array substrate and the substrate. If the display medium is formed by a liquid crystal material, the display panel 410 is referred to as an LCD panel (e.g. a transmissive display panel, a transflective display panel, a reflective display panel, a color-filter-on-array display panel, an array-on-color-filter display panel, a VA display panel, an IPS display panel, an MVA display panel, a TN display panel, a STN display panel, a PVA display panel, a S-PVA display panel, an ASV display panel, a FFS display panel, a CPA display panel, an ASM display panel, an OCB display panel, a S-IPS display panel, an AS-IPS display panel, an UFFS display panel, a PSA display panel, a dual-view display panel, a triple-view display panel, a three-dimensional display panel, other display panels, or a combination of the above) or a non-self-illuminating display panel. If an electroluminescent material is used to form the display medium, the display panel is called an electroluminescent display panel (e.g. a phosphor electroluminescent display panel, a fluorescent electroluminescent display panel, or a combination of the above), which is also called a self-illuminating display panel. The electroluminescent material may be an organic material, an inorganic material, or a combination thereof. Furthermore, molecules of the aforesaid materials comprise small molecules, high polymers, or a combination thereof. If the display medium comprises both a liquid crystal material and an electroluminescent material, the display panel is called a hybrid display panel or a semi-self-illuminating display panel.

In addition, the present invention further provides a method for fabricating a display panel. As shown in FIGS. 3A to 3D, the method comprises forming a pixel array substrate having the capacitive touch panel described in the above embodiments, assembling the pixel array substrate and another substrate having a transparent electrode, and disposing a display medium between the two substrates to form the display panel 410. Moreover, the present invention further provides a method for fabricating an electro-optical apparatus. The method comprises the process flow as shown in FIGS. 3A to 3D to form the display panel 410 having the capacitive touch panel. Thereafter, an electronic element 420 is electrically connected with the display panel 410 (not shown) to form the electro-optical apparatus 400 in FIG. 5.

To conclude, in the present invention at least one opening is disposed in the touch pads of each layer, and dummy pads are disposed on other layers to correspond to the positions of the openings, so as to reduce color aberration which occurs when light passes through the touch pads of different layers, wherein the light transmittance of the whole capacitive touch panel is improved to be more uniform by specially designing the size, shape, and position of the openings in the touch pads, specially designing the size, shape, and position of the corresponding dummy pads, and disposing additional dummy pads. In addition, partial openwork regions are arranged between the touch pads and the corresponding dummy pads to further improve the light transmittance of the capacitive touch panel.

Although the present invention has been disclosed by the above embodiments, they are not intended to limit the present invention. Persons of ordinary knowledge in the art may make some modifications and alterations without departing from the scope and spirit of the present invention. Therefore, the protection range sought by the present invention falls within the appended claims.

What is claimed is:

1. A capacitive touch panel, comprising:
    a substrate;
    a plurality of first touch pads disposed on the substrate, the first touch pads being arranged along a first direction and electrically connected with one another, and each first touch pad having at least a first opening, wherein the first opening is disposed in the first touch pads;
    a plurality of first dummy pads disposed on the substrate and insulated from the first touch pads;
    an insulator layer disposed on the substrate to cover the first touch pads and the first dummy pads;
    a plurality of second touch pads disposed on the insulator layer, the second touch pads being arranged along a second direction and electrically connected with one another, each second touch pad having at least a second opening arranged above the first dummy pads, and the size of the second opening being substantially larger than that of each first dummy pad, wherein the second opening is disposed in the second touch pads; and
    a plurality of second dummy pads disposed on the insulator layer and insulated from the second touch pads, wherein the second dummy pads are arranged above the first opening, and the size of the first opening is substantially larger than that of each second dummy pad, and the first touch pads, the first dummy pads, the second touch pads, and the second dummy pads are disposed in a manner of not overlapping with one another, wherein each of the second dummy pads is located in the center of the corresponding first opening of the first touch pads, and each of the first dummy pads is located in the center of the corresponding second opening of the second touch pads.

2. The capacitive touch panel of claim 1, wherein a center of the first opening is respectively substantial aligned with a center of one of the second dummy pads.

3. The capacitive touch panel of claim 1, wherein a center of the second opening is respectively substantial aligned with a center of one of the first dummy pads.

4. The capacitive touch panel of claim 1, wherein each first dummy pad and each second dummy pad are electrically floating.

5. The capacitive touch panel of claim 1, wherein the first direction substantially interlaces the second direction.

6. The capacitive touch panel of claim 1, further comprising:
    a plurality of first connection lines disposed on the substrate and connected between the first touch pads; and
    a plurality of second connection lines disposed on the insulator layer and connected between the second touch pads, wherein each first connection line respectively interlaces one of the second connection lines, and each first connection line is insulated from each second connection line.

7. The capacitive touch panel of claim 1, further comprising:
    a plurality of third dummy pads disposed on the substrate and distributed between the first touch pads and the first dummy pads, and each third dummy pad, the first touch pads, and each first dummy pad are insulated; and
    a plurality of fourth dummy pads disposed on the insulator layer and distributed between the second touch pads and the second dummy pads, and each fourth dummy pad, the second touch pads, and each second dummy pad are insulated.

8. The capacitive touch panel of claim 1, further comprising a passivation layer disposed on the insulator layer to cover the second touch pads and the second dummy pads.

9. A display panel, comprising the capacitive touch panel of claim 1.

10. An electro-optical apparatus, comprising the display panel of claim 9.

11. A method for fabricating a capacitive touch panel, comprising:
    forming a plurality of first touch pads and a plurality of first dummy pads on a substrate, the first touch pads being arranged along a first direction and electrically connected with one another, each first touch pad having at least a first opening, and the first dummy pads being insulated from the first touch pads, wherein the first opening is disposed in the first touch pads;
    forming an insulator layer on the substrate to cover the first touch pads and the first dummy pads;
    forming a plurality of second touch pads and a plurality of second dummy pads on the Insulator layer, the second touch pads being arranged along a second direction and electrically connected with one another, each second touch pad having at least a second opening arranged above the first dummy pads, the second dummy pads being insulated from the second touch pads, and the second dummy pads being arranged above the first opening, wherein the size of the second opening is substantially larger than that of each first dummy pad, and the size of the first opening is substantially larger than that of each second dummy pad, and the first touch pads, the first dummy pads, the second touch pads, and the second dummy pads are disposed in a manner of not overlapping with one another, and wherein the second opening is disposed in the second touch pads, wherein each of the second dummy pads is located in the center of the corresponding first opening of the first touch pads, and each of the first dummy pads is located in the center of the corresponding second opening of the second touch pads.

12. The method for fabricating a capacitive touch panel of claim 11, further comprising:
    forming a plurality of first connection lines disposed on the substrate and connected between the first touch pads; and
    forming a plurality of second connection lines disposed on the insulator layer and connected between the second touch pads, wherein each first connection line respectively interlaces one of the second connection lines, and each first connection line being insulated from each second connection line.

13. The method for fabricating a capacitive touch panel of claim 11, further comprising:
    forming a plurality of third dummy pads disposed on the substrate and distributed between the first touch pads and the first dummy pads, and each third dummy pad, the first touch pads, and each first dummy pad being insulated; and
    forming a plurality of fourth dummy pads disposed on the insulator layer and distributed between the second touch pads and the second dummy pads, and each fourth dummy pad, the second touch pads, and each second dummy pad being insulated.

14. The method for fabricating a capacitive touch panel of claim 11, further comprising forming a passivation layer on the insulator layer to cover the second touch pads and the second dummy pads.

15. A method for fabricating a display panel, comprising the method for fabricating a capacitive touch panel of claim 11.

16. A method of fabricating an electro-optical apparatus, comprising the fabricating method of claim 15.

17. A capacitive touch panel, comprising:
    a substrate;
    a plurality of first touch pads disposed on the substrate, the first touch pads being arranged along a first direction and electrically connected with one another, and each first touch pad having at least a first opening, wherein the first opening is disposed in the first touch pads;
    a plurality of first dummy pads disposed on the substrate and insulated from the first touch pads;
    an insulator layer disposed on the substrate to cover the first touch pads and the first dummy pads;
    a plurality of second touch pads disposed on the insulator layer, the second touch pads being arranged along a second direction and electrically connected with one another, each second touch pad having at least a second opening arranged above the first dummy pads, and the size of the second opening being substantially larger than that of each first dummy pad, and the second opening of each second touch pad overlapping the first dummy pad, wherein the second opening is disposed in the second touch pads; and
    a plurality of second dummy pads disposed on the insulator layer and insulated from the second touch pads, wherein the second dummy pads are arranged above the first opening, and the size of the first opening is substantially larger than that of each second dummy pad, and the first opening of each first touch pad overlaps the second dummy pad, wherein each of the second dummy pads is located in the center of the corresponding first opening of the first touch pads, and each of the first dummy pads is located in the center of the corresponding second opening of the second touch pads.

* * * * *